(12) United States Patent
Lee

(10) Patent No.: US 7,163,182 B2
(45) Date of Patent: Jan. 16, 2007

(54) SUCKER AND FILM COMBINATION

(76) Inventor: Mong-Yu Lee, 182, Chien-feng Road, Kang-shen, Kaohsiung (TW)

( * ) Notice: Subject to any disclaimer, the term of this patent is extended or adjusted under 35 U.S.C. 154(b) by 4 days.

(21) Appl. No.: 10/737,948

(22) Filed: Dec. 16, 2003

(65) Prior Publication Data

US 2005/0127257 A1    Jun. 16, 2005

(51) Int. Cl.
*A45D 42/14*    (2006.01)
*F16B 47/00*    (2006.01)

(52) U.S. Cl. .............................. 248/205.8; 248/205.5; 296/97.7

(58) Field of Classification Search ............. 248/205.5, 248/205.8; 296/97.7
See application file for complete search history.

(56) References Cited

U.S. PATENT DOCUMENTS

| | | | |
|---|---|---|---|
| 1,518,943 A | | 12/1924 | Story |
| 1,920,185 A | * | 8/1933 | Carr, Jr. ..................... 296/97.7 |
| 2,736,375 A | | 2/1956 | Rupert |
| 3,338,293 A | | 8/1967 | Hohmann |
| 3,879,005 A | | 4/1975 | Flick |
| 4,846,429 A | | 7/1989 | Scheurer et al. |
| 5,020,754 A | | 6/1991 | Davis et al. |
| 5,253,393 A | | 10/1993 | Levin |
| 5,390,837 A | | 2/1995 | Ruffolo, Jr. |
| 5,405,112 A | | 4/1995 | Trethewey |
| D376,308 S | | 12/1996 | Lee |
| 5,588,476 A | * | 12/1996 | Trethewey ............. 160/370.12 |
| 5,611,511 A | * | 3/1997 | Lee .......................... 248/205.8 |
| 5,762,305 A | | 6/1998 | Lee |
| 5,911,394 A | | 6/1999 | Lee |
| 6,089,517 A | * | 7/2000 | Johnstone ................ 248/205.5 |
| 6,131,865 A | * | 10/2000 | Adams ..................... 248/206.2 |
| 6,896,278 B1 | * | 5/2005 | Hepburn .................. 280/304.3 |

FOREIGN PATENT DOCUMENTS

JP        3022357        3/2000

* cited by examiner

*Primary Examiner*—Amy J. Sterling
(74) *Attorney, Agent, or Firm*—Fredrikson & Byron, P.A.

(57) ABSTRACT

A sucker and film combination including a sucker comprising a body useful for attaching the sucker to a surface. A column is in contact with the body. The column includes a groove useful for engaging a film. A stem useful for detaching the body from the surface is in contact with the body. The film comprises a substantially planar surface. A through-hole wall extends through the substantially planar surface. The through-hole wall defines a column receiver portion and a stem receiver portion.

10 Claims, 3 Drawing Sheets

SUCKER AND FILM COMBINATION

TECHNICAL FIELD

The present invention relates to a sucker and film combination, and, more particularly, to a sucker and film combination that allows for reduced movement between the film and the sucker when the sucker is repositioned.

BACKGROUND OF THE INVENTION

Suckers are useful devices that allow lightweight objects to be attached to generally smooth and substantially planar surfaces. Suckers can be attached to such a surface by means of a suction force. Commonly, the sucker will include a holding structure to hold an object, such as a hanging decoration or a film. Many suckers also include a handle, separate or integral with the holding structure, useful for applying force to the sucker to attach or detach it from a surface.

Many known suckers able to achieve sufficient sucker force to hold an object are difficult to remove from the surface to which they are attached. Current suckers with special detachment members combine them with the holding structure. Others provide the holding structure without a feature to appropriately secure the object. Therefore, known suckers of these types allow the object to move relative to the holding structure while the sucker is being detached from the surface. This movement may damage the object, especially when the object is delicate or easily torn, such as a film.

Known films have generally circular apertures or slits to receive a sucker, and the holding structure of the sucker supports the films at these generally circular apertures or slits when the film and sucker assembly is attached to a surface. These types of apertures or slits do not appropriately receive the sucker to provide a fit that allows for relatively little movement between the film and the sucker. This lack of appropriate fit allows the film to move relative to its support structure on the sucker, which may damage the film. The risk of damage is especially great during times the sucker and film assembly is being attached or detached from a surface. Hence, the need exists for a sucker that is both easily attachable and detachable from a surface, and also provides for relatively small movement between an object and the holding structure.

SUMMARY OF THE INVENTION

The present invention includes both a sucker and film, individually and in combination, as well as their method of use.

In certain embodiments, the sucker includes a body useful for attaching the sucker to a surface, at least one stem in contact with the body, a gripper in some multiple stem embodiments bridging at least two of the stems, and a column in contact with the body which includes a groove useful for engaging a film. Applying a force to the stem causes a detachment of the body from the surface axially extending in a certain direction.

The invention also includes a film. The film comprises a substantially planar surface, a through-hole wall defining a column receiver portion useful for receiving the column of a sucker, and at least one stem receiver portion useful for receiving at least one stem of a sucker.

In use, the film is supported by the column of a sucker when the sucker is attached to a surface. When a force is applied to at least one stem of the attached sucker it causes the sucker to detach from the surface without the film substantially moving relative to the column.

The invention also includes the method of use of the sucker and film, both individually and in combination. In certain embodiments, the method comprises providing both a sucker and film such as those described above. The film may be placed in contact relation with the sucker, and the sucker may be attached to the surface. The sucker may be attached to the surface before the film is placed in contact relation with the sucker, or the film may be placed in contact relation with the sucker before the sucker is attached to the surface.

DETAILED DESCRIPTION

Figure 1:
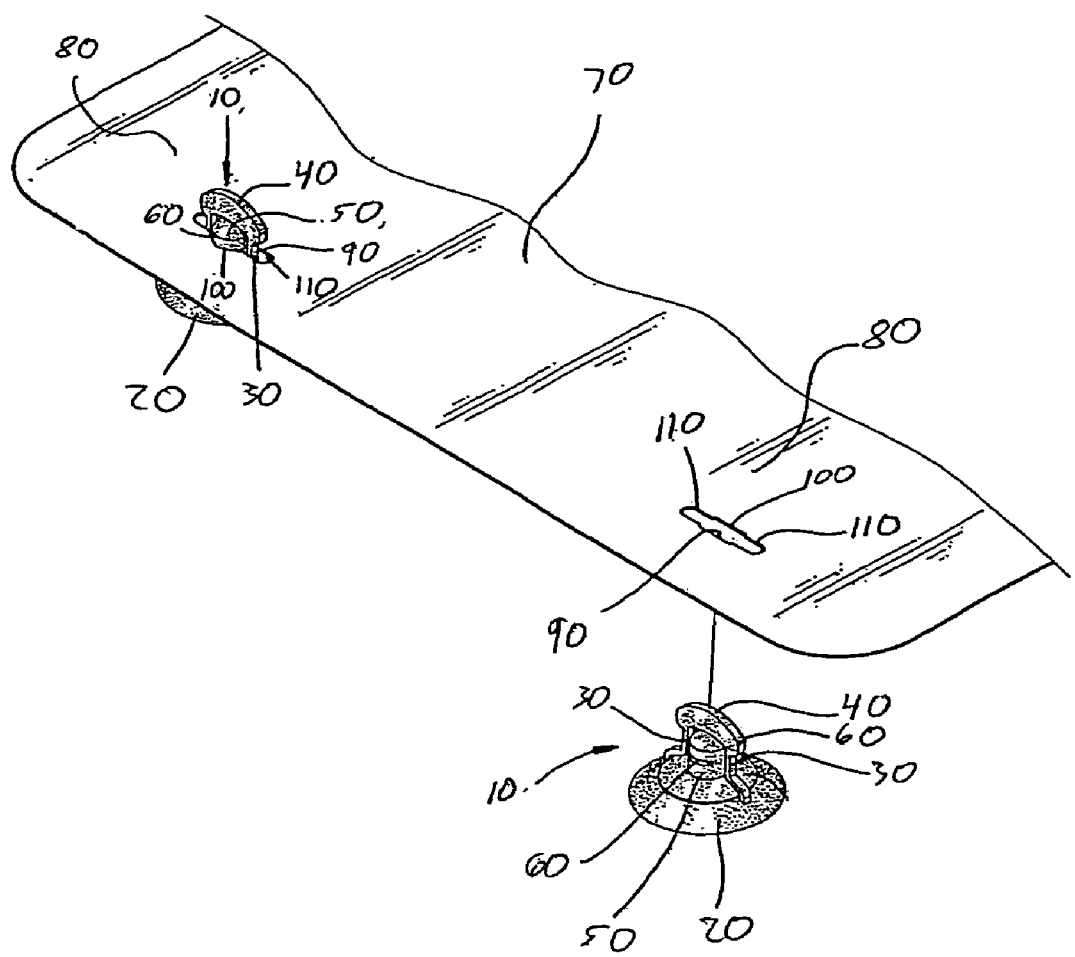
FIG. 1 is a perspective view of a sucker and film combination in an embodiment of the present invention.

Referring to the embodiment of the invention shown in FIG. 1, the invention comprises a sucker 10 that includes a body 20, a stem 30, a gripper 40, a column 50, and a groove 60. The invention also includes a film 70, having a substantially planar surface 80, a through-hole wall (or via) 90, a column receiver portion 100, and a stem receiver portion 110.

The sucker 10 may be attached to a surface (not shown) by its body 20. The body 20 may be any size or shape that allows it to attach to a surface by suction force. For example, the body 20 may be circular or rectangular. The body 20 generally comprises a soft material that allows it to be depressed against a surface to apply a suction force. However, the body 20 may also include a relatively harder material, and the suction force may be applied with a vacuum pump or the like. Additionally, the body 20 may include two or more sections. One section may be relatively flexible and be located towards the outside edge of the body 20. The other section may be relatively inflexible and located inwards of the relatively flexible section, the relatively inflexible section useful for supporting the column 50.

The surface can be any surface that will allow the sucker to attach by suction force. For example, the surface may be a sheet of glass or the like. The surface may be located, for example, in a building or a vehicle.

Figure 2:
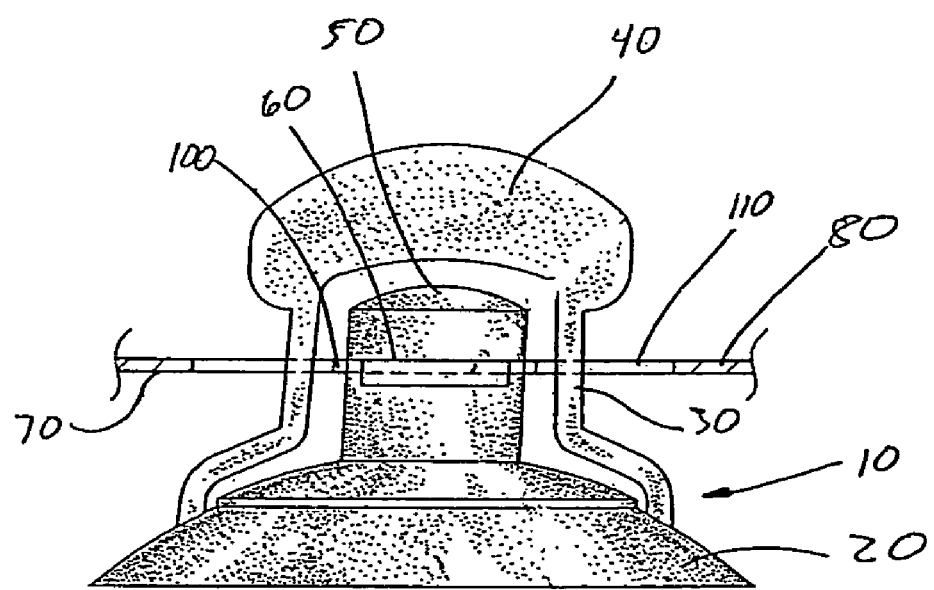
FIG. 2 is a side view of a sucker and film combination in an embodiment of the present invention.
Figure 3:
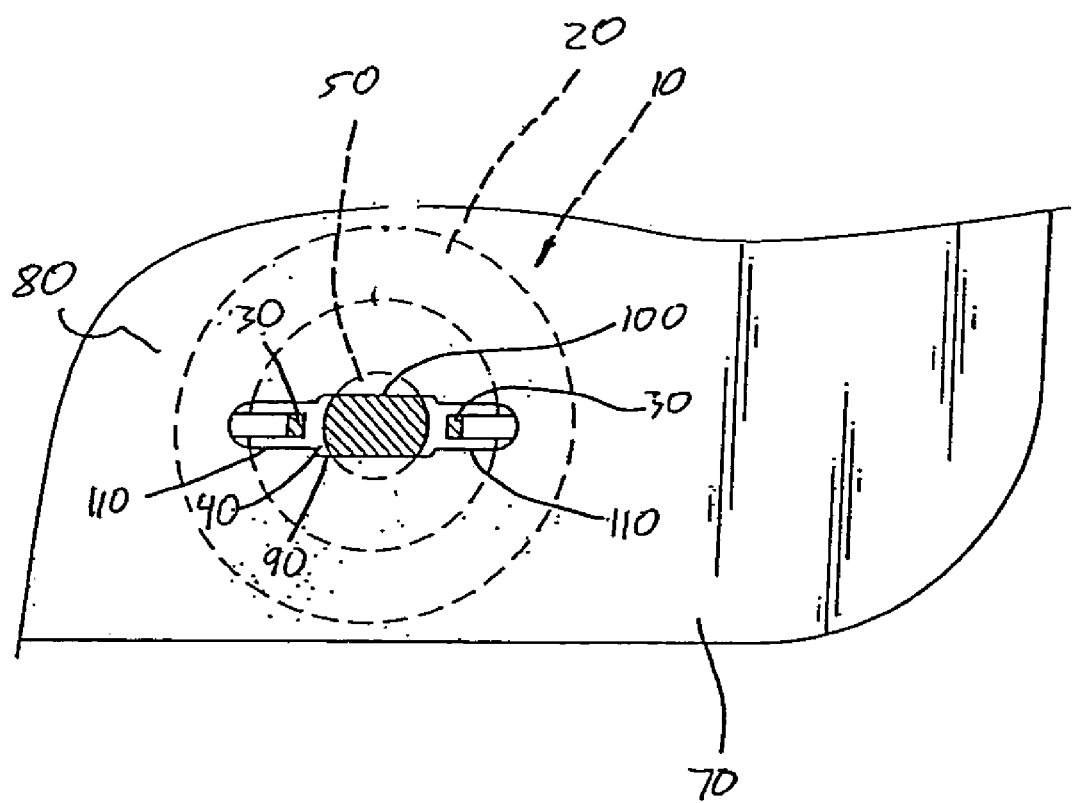
FIG. 3 is a top view of a sucker and film combination in an embodiment of the of the present invention.

The stem 30 has a first end in contact with the body 20. As many stems 30 as desired may be in contact with the body 20. The stems 30 may be formed integrally with the body 20, or may be a separate piece attached in ways well understood in the art, such as adhesives or fasteners. If a gripper 40 is provided, the stem 30 has a second end attached to the gripper 40. The gripper 40 may be of any shape or size suitable to allow a user to propagate force through it to the stems 30, and may be formed integrally with the stems 30, or may be a separate piece attached to the stems 30. When a user wants to remove the sucker 10 form the surface, the user can pull the gripper 40 in any direction away from the body 20, thereby breaking the vacuum. The force applied to the gripper 40 can propagate through any or all of the provided stems 30 to concentrate on the portion of the body 20 connected to the first end of the stem 30 to raise a part of the body 20. When there are two stems 30 placed across from each other as shown in FIGS. 1–3, applying a force to the stems 30 causes a detachment of the body 20 from the surface axially extending in a certain direction. Accordingly, the sucker 20 can be removed from the surface easily. If no gripper 40 is provided, the user may pull the second end of the stem 30, and the body 20 will detach from the surface in the same manner as described above.

The column 50 has a first end in contact with the body 20. The column 50 may be of any shape or size suitable for supporting the film 70, and may be formed integrally with the body 20, or be a separate piece attached thereto. The column 50 contains a groove 60. The groove 60 is designed to engage with the film 70. The shape and size of the groove 60 can be of any shape and size to be able to engage the film 70, and the column 50 may contain as many grooves 60 as desired. In the embodiment shown in FIG. 1, the column 50 contains two grooves 60 that are symmetrically straight. Preferably, when the film 70 is attached to the sucker 10, the column receiver portion 100 of the through-hole wall 90 is in contact relation with the groove 60. An example of the column receiver portion 100 engaging with the groove 60 is shown in FIG. 2. Of course, such a sucker 10 as described above may be used to support objects other than films.

The film 70 may be any object capable of containing a substantially planar surface 80. For example, the film 70 could be a shade or sunscreen. The film 70 can comprise any suitable material. For example, the film may comprise polyester. The substantially planar surface 80 may be of any size that allows for a through-hole wall to be placed therein. The through-hole wall 90 defines an aperture and is designed to receive and be supported by the sucker 10. There may be as many through-hole walls 90 in the film 70 as desired. Preferably, the film includes four through-hole walls 90. The through-hole wall 90 has a column receiver portion 100. The column receiver portion is sized to receive the column 50. The through-hole wall 90 also has a stem receiver portion 110. The stem receiver portion 110 is designed to receive the stem 30. In some embodiments, there are two stem receiver portions 110 placed across the column receiver portion 100 from each other. Also in some preferred embodiments, such as those shown in FIGS. 1 and 3, the column receiver portion 100 is greater in width than the stem receiver portions 110. In such embodiments, the area between the stem receiver portions 110 and the stems 30 is reduced. This is desirable, for example, when the film 70 is a shade because it reduces the area where light may bypass the shade.

In some embodiments, the column receiver portion 100 and the stem receiver portion 110 are sized to allow the stems 30 and the gripper 40 to pass through them in order to allow the column receiver portion 100 to engage with the column 50. The column receiver portion 100 may also be sized to allow the stems 30 and the gripper 40 to move relative to the film 70, as shown in FIG. 3. Preferably, the column receiver portion 100 is sized to allow the column 50 to pass through, although it may contact column 50, before engaging with the groove 60.

In operation of certain embodiments, a film 70 is attached to a sucker 10 by inserting the sucker 10 through the aperture defined by the through-hole wall 90 until the column receiver portion 100 becomes engaged with the groove 60. The sucker 10 can be attached to a surface by, for example, placing its body 20 against the surface and applying a force downward onto the body 20 to expel any gases contained therein, thereby creating a suction force. The film 70 is held proximate to the surface by the sucker 10. In such a state, the film 70 is supported by the column 50 in such a manner that any of the stems 30 may be moved without causing the film 70 to substantially move relative to the column 50. Of course, the sucker 10 may be attached to the surface before the film 70 is placed in contact relation with the column 50, or the film 70 may be placed in contact relation with the column 50 before the sucker 10 is attached to the surface.

While the invention has been described in conjunction with specific embodiments thereof, it is evident that other alternative, modifications, and variations will be apparent to those skilled in the art in light of the foregoing description. Accordingly, it is intended to embrace all such alternatives, modifications, and variations which fall within the spirit and broad scope of the claims.

What is claimed is:

1. A sucker and film combination useful for attaching the film to a surface comprising:
    a sucker, wherein the sucker includes a body useful for attaching the sucker to a surface, the body including an outer port ion and an inner portion, at least one stem in contact with the outer portion of the body, and a column extending away from the inner portion of the body, the column defining symmetrically straight grooves oriented generally perpendicular to a direction in which the column extends from the body, the grooves being useful for engaging the film; and
    a film, wherein the film includes a substantially planar surface, a through-hole wall defining a column receiver portion useful for engaging the film within the grooves defined by the column of the sucker, and at least one stem receiver portion useful for receiving the at least one stem of the sucker;
    wherein, when the film is engaged by the grooves of the column and the sucker is attached to the surface, a force can be applied to the at least one stem, causing the sucker to detach from the surface without the film being substantially moved relative to the column.

2. A method of using a sucker and film combination comprising:
    providing a sucker, wherein the sucker includes a body useful for attaching the sucker to a surface, the body including an inner portion and an outer portion, at least one stem in contact with the outer portion of the body, and a column extending away from the inner portion of the body, the column defining symmetrically straight grooves oriented generally perpendicular to a direction in which the column extends from the body;
    providing a film, wherein the film includes a substantially planar surface, a through-hole wall defining a column receiver portion useful for engaging the film within the grooves of the column of the sucker, and at least one stem receiver portion useful for receiving the at least one stem of the sucker;
    placing the film in contact relation with the sucker by inserting the column of the sucker through the column receiver portion and engaging the film within the grooves of the column; and
    attaching the sucker to the surface.

3. The method of using a sucker and film combination of claim 2, wherein the sucker is attached to the surface before the film is placed in contact relation with the sucker.

4. The method of using a sucker and film combination of claim 2, wherein the film is placed in contact relation with the sucker before the sucker is attached to the surface.

5. The sucker and film combination of claim 1, wherein the sucker further includes a gripper connected to the at least one stem.

6. The sucker and film combination of claim 1, wherein the sucker further includes a plurality of stems and a gripper bridging at least two of the stems.

7. The method of using the a sucker and film combination of claim 2, further comprising applying a force to the at least one stem thereby causing the sucker to detach from the surface without the film being substantially moved relative to the column.

8. The method of using a sucker and film combination of claim 7, wherein the sucker further includes a plurality of stems and a gripper bridging at least two of the stems, and applying the force to the at least one stem is accomplished via the gripper.

9. The sucker and film combination of claim 1, wherein the column receiver portion is greater in width than the stem receiver portion.

10. The method of using a sucker and film combination of claim 7, wherein the sucker further includes a gripper connected to the at least one stem, and applying the force to the at least one stem is accomplished via the gripper.

* * * * *